US009983898B2

(12) United States Patent
Anderson et al.

(10) Patent No.: US 9,983,898 B2
(45) Date of Patent: *May 29, 2018

(54) GENERATING A DEPLOYMENT PATTERN FOR REUSE IN A NETWORKED COMPUTING ENVIRONMENT

(71) Applicant: International Business Machines Corporation, Armonk, NY (US)

(72) Inventors: Jason L. Anderson, San Jose, CA (US); Gregory J. Boss, Saginaw, MI (US); James P. Busche, San Jose, CA (US); Animesh Singh, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/054,465

(22) Filed: Feb. 26, 2016

(65) Prior Publication Data

US 2016/0179563 A1    Jun. 23, 2016

Related U.S. Application Data

(63) Continuation of application No. 13/919,211, filed on Jun. 17, 2013, now Pat. No. 9,317,311.

(51) Int. Cl.
  *G06F 9/46* (2006.01)
  *G06F 9/455* (2018.01)
  (Continued)

(52) U.S. Cl.
  CPC ............ *G06F 9/45558* (2013.01); *G06F 8/61* (2013.01); *G06F 9/45533* (2013.01); *G06F 9/50* (2013.01);
  (Continued)

(58) Field of Classification Search
  CPC .......... G06F 9/45533; G06F 8/61; G06F 9/50; G06F 9/44505; G06F 2009/45562; G06F 2009/4557; G06F 2009/45595
  See application file for complete search history.

(56) References Cited

U.S. PATENT DOCUMENTS 9,098,214 B1 * 8/2015 Vincent ................. G06F 9/4856
9,442,769 B2 * 9/2016 Ferris ...................... G06F 9/505
(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Camquy Truong
(74) *Attorney, Agent, or Firm* — Maeve M. Carpenter; Maxine L. Barasch; Keohane & D'Alessandro, PLLC (57) ABSTRACT

An approach for generating a deployment pattern for reuse after the deployment of a set of virtual machines and related application artifacts in a networked computing environment (e.g., a cloud computing environment) is provided. In a typical embodiment, information associated with one or more previously provisioned application environments is derived and, after analyzing the information, a deployment pattern is created in the form of tangible artifacts which may be reuse for further deployments without the need to trace back the original procedures used to deploy the previously previsioned application environment.

14 Claims, 5 Drawing Sheets (51) Int. Cl.
*G06F 9/445* (2018.01)
*G06F 9/50* (2006.01)

(52) U.S. Cl.
CPC .. *G06F 9/44505* (2013.01); *G06F 2009/4557* (2013.01); *G06F 2009/45562* (2013.01); *G06F 2009/45595* (2013.01)

(56) References Cited

U.S. PATENT DOCUMENTS

| | | |
|---|---|---|
| 9,558,041 B2* | 1/2017 | Vadkerti ............ G06F 9/45558 |
| 2008/0270564 A1 | 10/2008 | Rangegowda et al. |
| 2009/0007106 A1 | 1/2009 | Araujo, Jr. et al. |
| 2009/0063752 A1 | 3/2009 | Dow |
| 2009/0094576 A1* | 4/2009 | Bouchard, Sr. ............ G06F 8/30 717/104 |
| 2012/0096459 A1 | 4/2012 | Miyazaki |
| 2012/0131594 A1 | 5/2012 | Morgan |
| 2012/0159634 A1 | 6/2012 | Haikney et al. |
| 2012/0192182 A1 | 7/2012 | Hayward et al. |
| 2012/0284471 A1 | 11/2012 | Hur et al. |
| 2014/0373011 A1 | 12/2014 | Anderson et al. |

OTHER PUBLICATIONS

Mell, P. et al., "The NIST Definition of Cloud Computing", National Institute of Standards and Technology, Information Technology Laboratory, Version 15, Oct. 7, 2009, 2 pages.

Himura, Y. et al., "Discovering Configuration Templates of Virtualized Tenant Networks in Multi-tenancy Datacenters via Graph-mining", ACM SIGCOMM Computer Communication Review, vol. 42, No. 3, Jul. 2012, 7 pages.

"Rational Automation Framework", www-142.ibm.com, 2 pages, Feb. 7, 2013.

"Tivoli Application Dependency Discovery Manager", www-01.ibm.com, 2 pages, Feb. 7, 2013.

Truong, U.S. Appl. No. 13/919,211, Office Action dated Mar. 25, 2015, 7 pages.

Truong, U.S. Appl. No. 13/919,211, Final Office Action dated Jul. 31, 2015, 8 pages.

Truong, U.S. Appl. No. 13/919,211, Notice of Allowance dated Jan. 21, 2016, 18 pages.

\* cited by examiner

GENERATING A DEPLOYMENT PATTERN FOR REUSE IN A NETWORKED COMPUTING ENVIRONMENT

The present patent document is a continuation of U.S. patent application Ser. No. 13/919,211, filed Jun. 17, 2013, entitled "GENERATING A DEPLOYMENT PATTERN FOR REUSE IN A NETWORKED COMPUTING ENVIRONMENT", the disclosure of which is incorporated herein by reference.

TECHNICAL FIELD

Embodiments of the present invention relate generally to virtual machine deployments. Specifically, the present invention relates to a generating deployment pattern for reuse after the deployment of a set of virtual machines and related application artifacts in a networked computing environment (e.g., a cloud computing environment).

BACKGROUND

Cloud computing is a model for enabling convenient, on-demand network access to a shared pool of configurable resources (e.g., networks, servers, storage, applications and services) that can be rapidly provisioned and released with minimal management effort or service provider interaction. In the history of modern-era computing, the rise of the commercial Internet in general and the Web in particular have allowed for the shift toward cloud computing.

As web-centric computing took root within Information Technology (IT) departments, a new reality dawned: operations and applications need not be confined to distinct physical resources. In turn, a logical view of IT—enabled by the virtualization of computing, storage, client and network resources from underlying physical hardware—became not just possible but preferable to reduce costs and optimize performance. This development dovetailed with increasing mobility. Today, users demand secure remote access to critical applications whenever they want them, from whatever device they use, and wherever they happen to be. The IT industry therefore has been moving toward an automated, dynamic, on-demand IT environment for some time. In other words, it has been building the pathway to cloud computing. Many businesses today are now seeking efficient ways to move some or all of their systems and applications to a cloud environment.

SUMMARY

In general, an approach for generating a deployment pattern for reuse after the deployment of a set of virtual machines and related application artifacts in a networked computing environment (e.g., a cloud computing environment) is provided. In a typical embodiment, information associated with one or more previously provisioned application environments is derived and, after analyzing the information, a deployment pattern is created in the form of tangible artifacts which may be reused for further deployments without the need to trace back the original procedures used to deploy the previously provisioned application environment.

A first aspect provides a method for generating a pattern for deploying a virtual object in a networked computing environment, comprising: identifying one or more virtual machines associated with a virtual object; deriving attributes associated with each of the virtual machines; generating artifacts based on the derived attributes; and generating a pattern based on the generated artifacts.

A second aspect provides a system for generating a pattern for deploying a virtual object in a networked computing environment, comprising: a memory medium comprising instructions; a bus coupled to the memory medium; and a processor coupled to the bus that when executing the instructions causes the system to: identify one or more virtual machines associated with a virtual object; derive attributes associated with each of the virtual machines; generate artifacts based on the derived attributes; and generate a pattern based on the generated artifacts.

A third aspect provides a computer program product for generating a pattern for deploying a virtual object in a networked computing environment, the computer program product comprising a computer readable storage media, and program instructions stored on the computer readable storage media, to: identify one or more virtual machines associated with a virtual object; derive attributes associated with each of the virtual machines; generate artifacts based on the derived attributes; and generate a pattern based on the generated artifacts.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set"

is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As used herein, the term "hypervisor" (or Virtual Machine Manager (VMM)) refers to a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Multiple instances of a variety of operating systems may share the virtualized hardware resources.

As used herein, the term "middleware" refers to computer software that provides services to software applications beyond those available from the operating system.

As indicated above, an approach for generating a deployment pattern for reuse after the deployment of a set of virtual machines and related application artifacts in a networked computing environment (e.g., a cloud computing environment) is provided. In a typical embodiment, information associated with one or more previously provisioned application environments is derived and, after analyzing the information, a deployment pattern is created in the form of tangible artifacts which may be reused for further deployments without the need to trace back the original procedures used to deploy the previously previsioned application environment.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
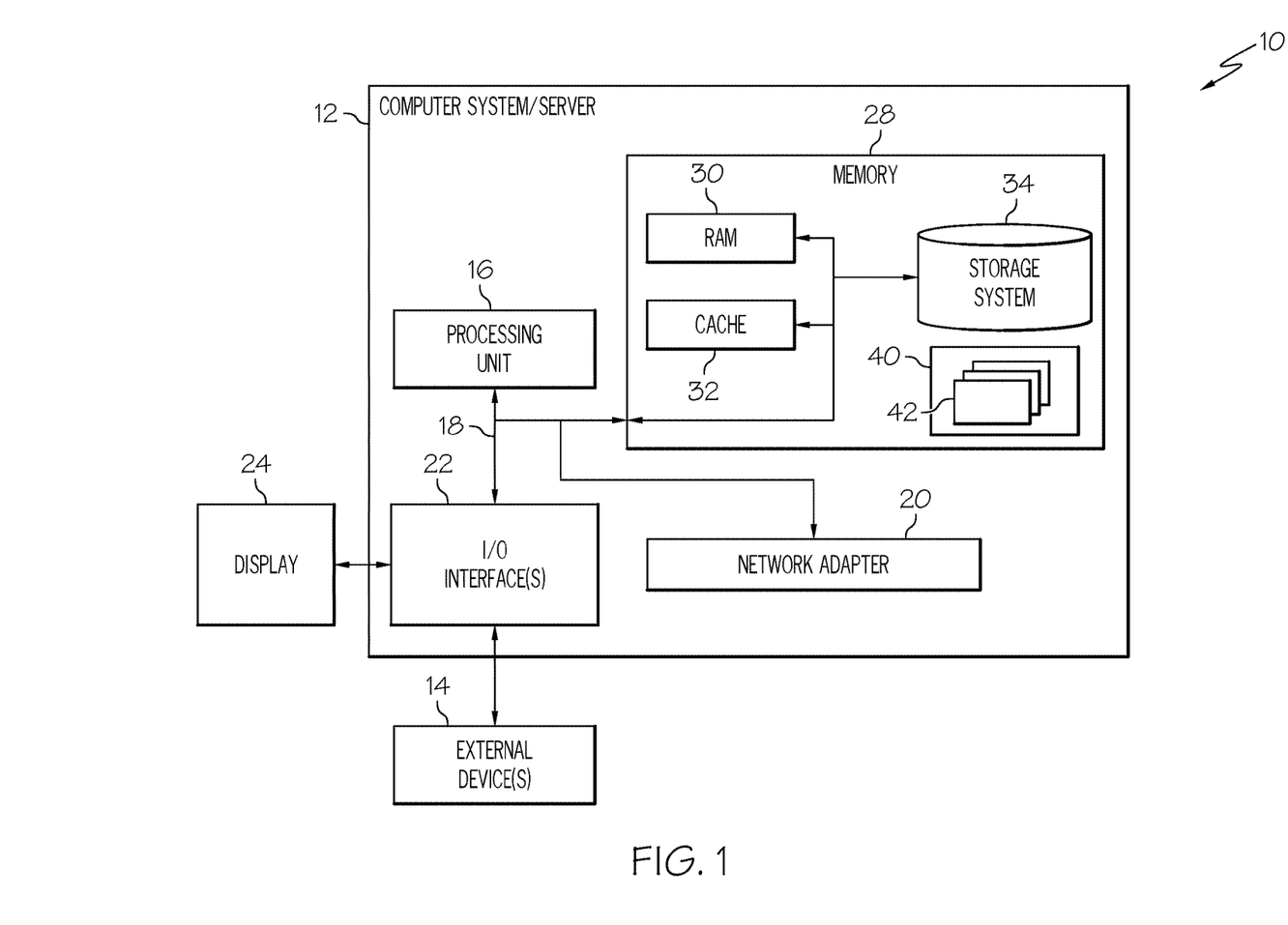
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (i.e., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (i.e., at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
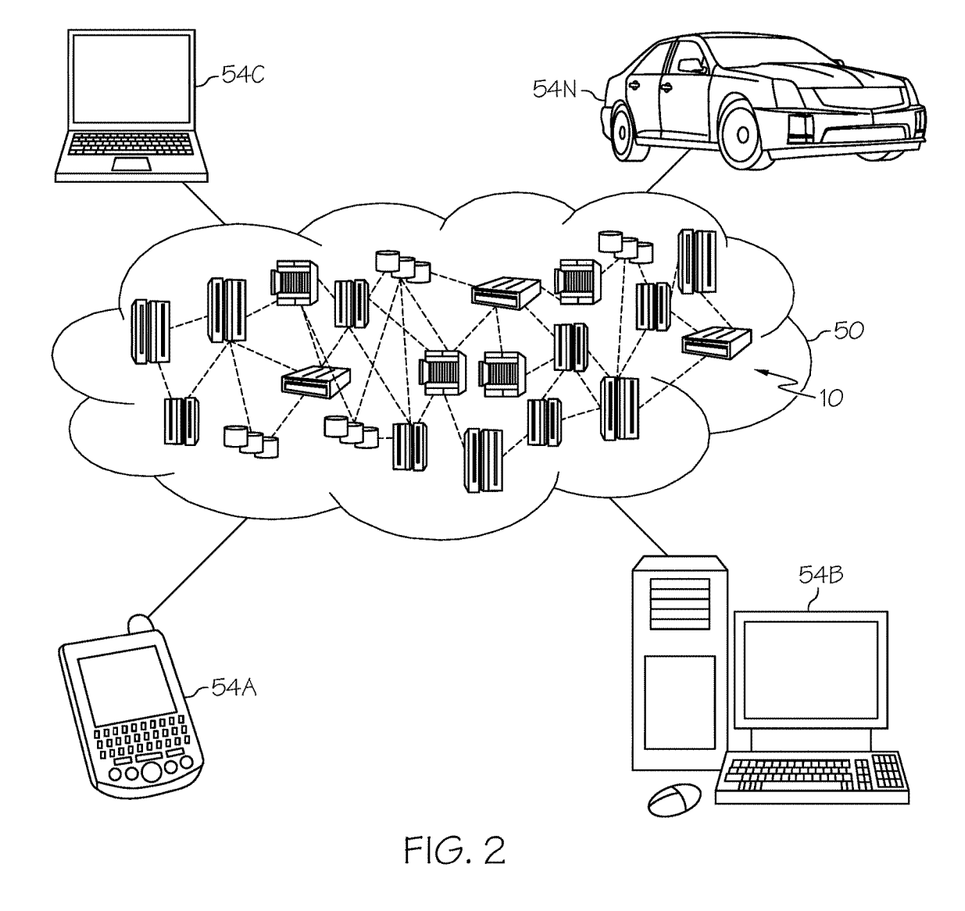
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
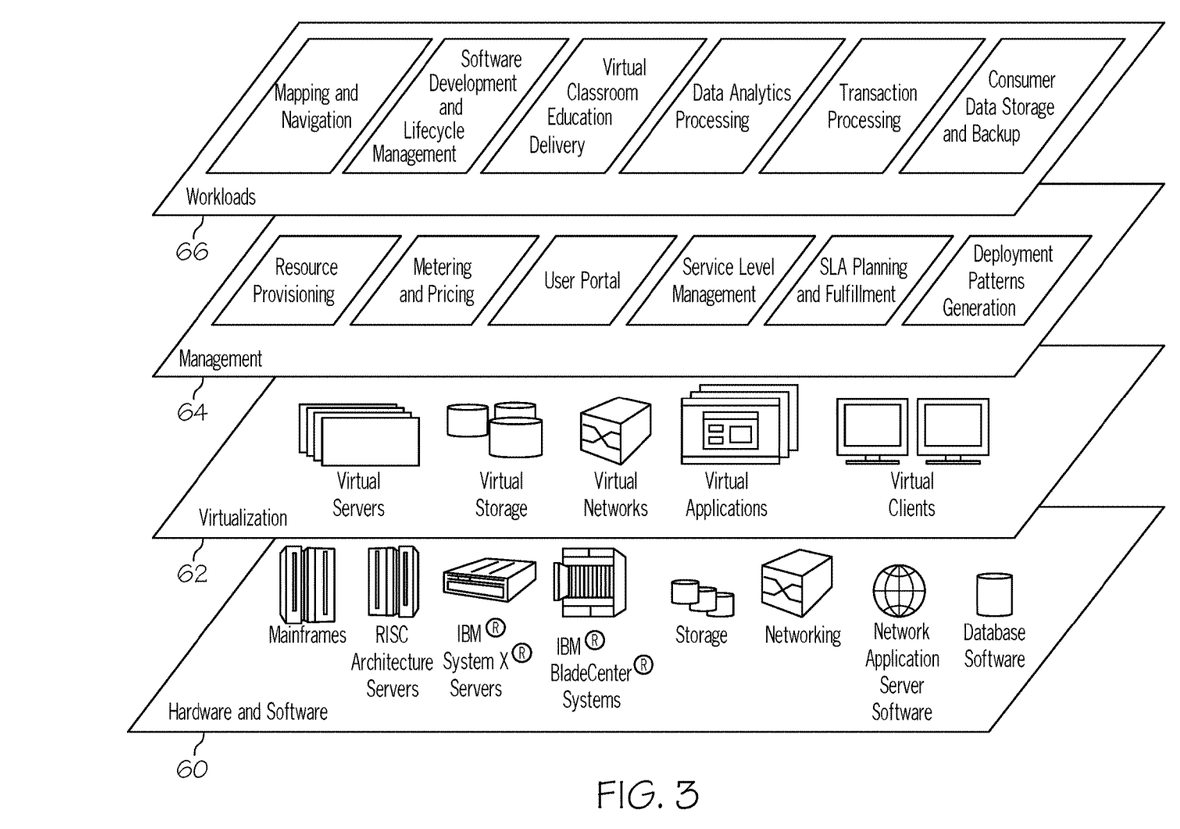
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM system P® systems, IBM System X® servers, IBM BladeCenter® systems, storage devices, networks, and networking components. Examples of software components include network application server software. In one example, IBM WebSphere® application server software and database software. In one example, IBM DB2® database software. (IBM, system x, System p, System x, BladeCenter, WebSphere, Tivoli, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is deployment pattern generation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the deployment pattern generation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
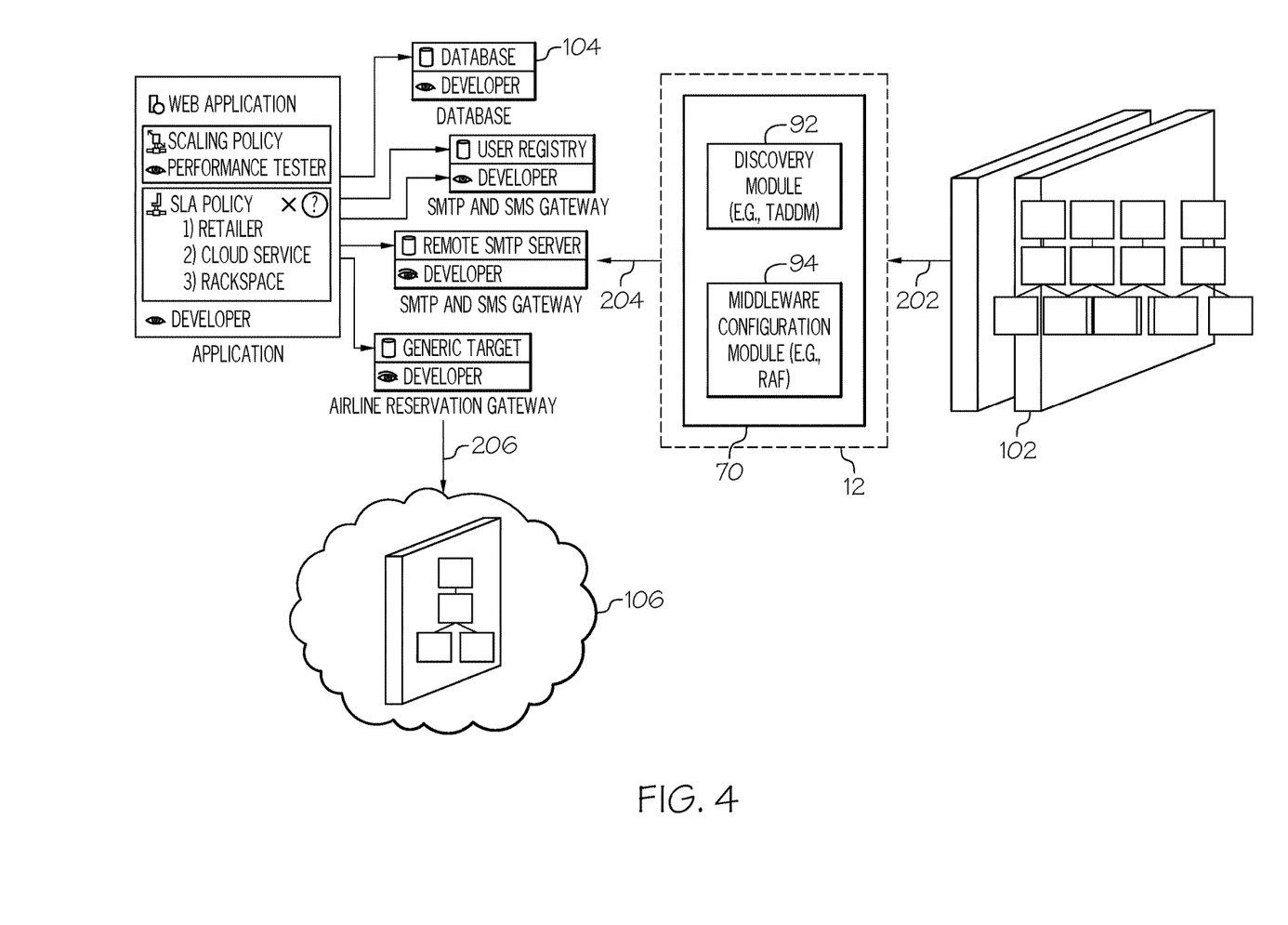
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment (e.g., a cloud computing environment 50). A computer system/server 12, which can be implemented as either a stand-alone computer system or as a networked computer system is shown in FIG. 4. In the event the teachings recited herein are practiced in a networked computing environment, each client need not have a deployment pattern generation engine (engine 70). Rather, engine 70 could be loaded on a server or server-capable device that communicates (e.g., wirelessly) with the clients to provide deployment pattern generation functionality. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a discovery module 92 and middleware configuration module 94 to provide deployment pattern generation hereunder.

Along these lines, engine 70 may perform multiple functions similar to a general-purpose computer. Specifically, among other functions, engine 70 may: identify one or more virtual machines associated with a virtual object; derive attributes associated with each of the virtual machines; generate artifacts based on the derived attributes; and generate a pattern based on the generated artifacts.

Illustrative Example

This section will describe the above-discussed teachings in the context of an illustrative example. It is understood that this example (e.g., the applications, services, values, etc., recited herein) are intended to be illustrative and that other embodiments may exist within the teachings described herein.

This disclosure describes a method which may create a deployment pattern for an application by automatically detecting the corresponding application and VM configurations running on virtual machines provisioned from another cloud management stack. The deployment pattern may be reused for future deployments of the application without the need to trace back the original procedures used to deploy the application environment.

As shown in FIG. 4, the environment includes system 12, legacy system including legacy application 102, and target cloud 106. System 12 includes the deployment pattern generation engine (or engine) 70. The engine 70 may derive information associated with one or more previously provisioned application environments and, after analyzing the information, create deployment patterns in the form of tangible artifacts which may be reused for further deployments without the need to trace back the original procedures used to deploy the previously previsioned application environment(s).

At 202, the discovery module 92 may capture application environment data related to a previously provisioned application (e.g., legacy application 102). The discovery module 92 may discover existing operating system, external hypervisor, and middleware components. To accomplish this, the discovery module 92 identifies a list of virtual machines (VMs) where the application is currently running. Using the list, the discovery module 92 discovers associated attributes of the identified VMs. The operating system (OS) configuration of each VM is analyzed to determine attributes related to the VM including the OS, hypervisor, disk, memory, central processing unit (CPU), architecture, and/or speed. In one example, IBM Tivoli® Application Dependency Discovery Manager (TADDM) may be used to discover the attributes of the identified VMs.

The discovery module 92 detects the type of middleware that is installed and the associated version of the middleware. For each middleware and associated version, the discovery module 92 identifies whether a hypervisor image or plugin exists and can be used. In one example, hypervisor images are provided as part of IBM PureApplication™ System/IBM Workload Deployer. If there is a middleware match for an IBM® WebSphere® Process Server Hypervisor Edition image, a decision is made whether the hypervisor image can be used. If the hypervisors are different, don't use the image. If the CPU Architecture is different, the image may be used and other metrics may be modified to compensate for performance. In other words, if there is not a CPU architecture match, a test to measure a service-level agreement (SLA) such as response times and the like is performed. If other characteristics need to be changed to meet the SLA (e.g., add more virtual CPUs, more memory, etc.) than the original instance, those characteristics may be modified. If the disk size is different, recapture an extended version with the appropriate size.

At 204, a deployment pattern is generated. In one example, a virtual system pattern may be created when a hypervisor image exists. To create the deployment pattern for each VM/middleware, three steps are performed. First, the associated metadata of the hypervisor image (open virtualization format (OVF) file, osNode.xml, etc.) is captured. Any appropriate changes are made (e.g., to the default memory or CPU). Second, the middleware configuration is captured. In one example, the middleware configuration is captured using middleware configuration module 94. In one example, the middleware configuration module 94 may comprise Rational® Automation Framework (RAF). RAF is used to discover existing key configuration parameters of both middleware and application components, so that this configuration information could be reused for future deployable cloud patterns. Third, given the input of different middleware and their configuration data, an analysis mechanism will derive the dependencies of each middleware. The above steps are repeated for all the VMs/middleware in the group of identified VMs. A script package to apply the middleware configuration and associated dependencies is generated. A deployment pattern is created and the middleware and script packages are added.

In one example, a virtual system pattern may be created when a hypervisor image does not exist. The JavaScript Object Notation (JSON) data from a TADDM report for a particular VM may be used to generate an OVF file, osNode.xml, etc. The configuration data of the middleware is captured by middleware configuration module 94 (e.g., RAF) for script package modeling. The VM is captured and then wrapped in an open virtual appliance or application (OVA) format using the image metadata (e.g., generated OVF file, associated osNode.xml, etc.). A deployment pattern is created based on the different OVAs that have been created.

In one example, a virtual application pattern may be created. For each piece of middleware, an existing plugin in the system is mapped. The parameters of the middleware and associated policies are populated (see function setConfiguration( ) below). Any assets/artifacts to the plugin (e.g., a WAR file, or database schema) are attached. Dependencies between plugins (see function setDependency( ) below) are created. In the following algorithm, each original configuration has an effect on one or more deployment characteristics. Deployment characteristics can include, but are not limited to, the following: (1) transactions/sec, (2) data redundancy, and (3) responsiveness to request volume. The algorithm calculates the effective magnitude of the deployment characteristics given the original configuration and then creates a virtual application pattern (VAP) which produces an effect closest to the original input's overall deployment characteristics.

Function setConfiguration( ) (1) for each original configuration value, calculate its effect on each deployment characteristic, (2) sum the effects for every original configuration value to determine the original instance's overall magnitude for the deployment characteristics, and (3) take the available VAP inputs and set them using an existing optimization algorithm (e.g., simplex method, genetic algorithms) such that they produce a nearly identical magnitude for each of the deployment characteristics.

Function setDependency( ) for each original plugin dependency, determine and output the required JSON configuration to create a reusable and easily consumable application import file (e.g., plugin names, connection timeouts, DB schema, compatibility mode).

Plugin dependencies can include, but are not limited to, the following: (1) Java Naming and Directory Interface (JNDI): name, connection timeouts, and max connections, (2) database (DB): schema, name, and compatibility mode, and (3) LDAP: name, user role, group role, and special subject mappings.

Referring back to FIG. 4, the generated deployment pattern is used to deploy the legacy application 102 to target cloud 106 at 206. The pattern may be used repeatedly to deploy the legacy application 102 without the need to trace back the original procedures used to deploy the previously provisioned application environment.

Figure 5:
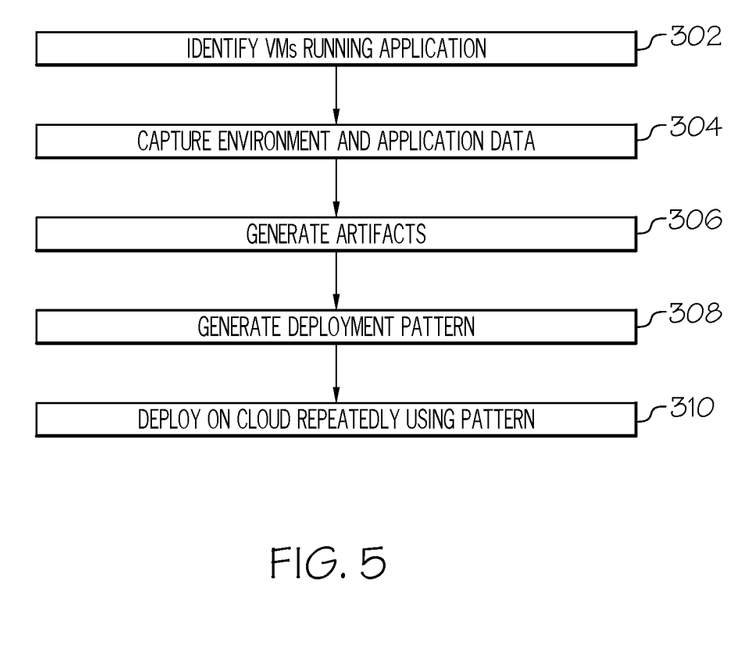
FIG. 5 depicts a method flow diagram according to an embodiment of the present invention.

Referring now to FIG. 5, a method flow diagram according to an embodiment of the present invention is shown. At 302, each VM running an application is identified. At 304, environment and application data associated with each identified VM is captured. For example, system attributes (e.g., OS, hypervisor, CPU, memory) and middleware configuration and dependencies for each VM are captured. At 306, artifacts are generated based on the system attributes, middleware configuration and dependencies. At 308, a deployment pattern is created based on the generated artifacts. At 310, the deployment pattern may be used to deploy the application repeatedly on the cloud.

While shown and described herein as a deployment pattern generation solution, it is understood that the invention further provides various alternative embodiments. For example, in one embodiment, the invention provides a computer-readable/useable medium that includes computer program code to enable a computer infrastructure to provide deployment pattern generation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide deployment pattern generation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for deployment pattern generation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for generating a pattern for deploying a virtual object in a networked computing environment, comprising:
   identifying one or more virtual machines on which a first instance of an application is currently running;
   deriving attributes associated with each of the identified virtual machines;
   generating artifacts based on the derived attributes;
   generating a pattern for a second instance of the application based on the generated artifacts, wherein the pattern is generated to match a characteristic of a deployment of the first instance;
   deploying the second instance of the application in the networked computing environment based on the generated pattern; and
   deploying, using the pattern, at least one more instance of the application in the networked computing environment, without needing to trace back an original procedure used to deploy a previously provisioned application environment.

2. The method of claim 1, wherein the attributes are associated with at least one of an operating system, hypervisor, central processing unit (CPU), memory, middleware configuration or middleware dependencies.

3. The method of claim 1, wherein the artifacts include at least one of an Open Virtualization Format (OVF) image or script package.

4. The method of claim 1, wherein the pattern is an Open Virtual Application (OVA) package.

5. The method of claim 1, wherein the networked computing environment is a cloud computing environment.

6. The method of claim 1, wherein a solution service provider provides a computer infrastructure operable to perform the method.

7. A system for generating a pattern for deploying a virtual object in a networked computing environment, comprising:
   a memory medium comprising instructions;
   a bus coupled to the memory medium; and
   a processor coupled to the bus that when executing the instructions causes the system to:
      identify one or more virtual machines on which a first instance of an application is currently running;
      derive attributes associated with each of the identified virtual machines;

generate artifacts based on the derived attributes;
generate a pattern for a second instance of the application based on the generated artifacts, wherein the pattern is generated to match a characteristic of a deployment of the first instance;
deploy the second instance of the application in the networked computing environment based on the generated pattern; and
deploy, using the pattern, at least one more instance of the application in the networked computing environment, without needing to trace back an original procedure used to deploy a previously provisioned application environment.

8. The system of claim 7, wherein the attributes are associated with at least one of an operating system, hypervisor, central processing unit (CPU), memory, middleware configuration or middleware dependencies.

9. The system of claim 7, wherein the pattern is an Open Virtual Application (OVA) package.

10. The system of claim 7, wherein the networked computing environment is a cloud computing environment.

11. A computer program product for generating a pattern for deploying a virtual object in a networked computing environment, the computer program product comprising a computer readable storage media, and program instructions stored on the computer readable storage media, to:
identify one or more virtual machines on which a first instance of an application is currently running;
derive attributes associated with each of the identified virtual machines;
generate artifacts based on the derived attributes;
generate a pattern for a second instance of the application based on the generated artifacts, wherein the pattern is generated to match a characteristic of a deployment of the first instance; and
deploy the second instance of the application in the networked computing environment based on the generated pattern; and
deploy, using the pattern, at least one more instance of the application in the networked computing environment, without needing to trace back an original procedure used to deploy a previously provisioned application environment.

12. The computer program product of claim 11, wherein the attributes are associated with at least one of an operating system, hypervisor, central processing unit (CPU), memory, middleware configuration or middleware dependencies.

13. The computer program product of claim 11, wherein the artifacts include at least one of an Open Virtualization Format (OVF) image or script package.

14. The computer program product of claim 11, wherein the networked computing environment is a cloud computing environment.

* * * * *